(12) United States Patent
Mitra et al.

(10) Patent No.: US 6,744,697 B2
(45) Date of Patent: Jun. 1, 2004

(54) CABLE MODEM CLOCK SYNCHRONIZATION USING SOFTWARE PARSING WITH HARDWARE ASSIST

(75) Inventors: Hirak Mitra, Sunnyvale, CA (US); David Stark, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/841,022

(22) Filed: Apr. 24, 2001

(65) Prior Publication Data

US 2001/0053193 A1 Dec. 20, 2001

Related U.S. Application Data

(60) Provisional application No. 60/199,720, filed on Apr. 26, 2000.

(51) Int. Cl.[7] .................. G04C 13/00; G04C 11/04; G04F 8/00; H04J 3/06; H04N 7/173
(52) U.S. Cl. .................. 368/46; 368/55; 368/113; 370/509; 370/516; 375/149; 375/356; 375/362; 725/111; 725/117
(58) Field of Search .................. 368/10, 46, 113, 368/118, 52, 55, 59; 370/509, 516; 375/149, 352, 362; 725/111, 117

(56) References Cited

U.S. PATENT DOCUMENTS

| 5,737,329 A | * | 4/1998 | Horiguchi .................. 370/342 |
| 5,838,667 A | * | 11/1998 | Bingham et al. ........... 370/294 |
| 6,230,326 B1 | * | 5/2001 | Unger et al. .................. 725/11 |
| 6,353,604 B2 | * | 3/2002 | Grimwood et al. ......... 370/335 |

* cited by examiner

*Primary Examiner*—Vit Miska

(57) ABSTRACT

SYNC parsing for Cable Modem Clock Synchronization is implemented using software processing with hardware assist in a manner that achieves the cost benefits of software SYNC parsing with the time accuracy of hardware SYNC parsing. Hardware scans for the arrival of new MPEG frames. Whenever any MPEG frame arrives, the MPEG frame is processed to extract MAC packets. If a SYNC packet is discovered during this processing, the software determines the SYNC arrival time, a comparison is made between the time the SYNC arrival time and the SYNC time value, and the software uses the difference to adjust the Cable Modem clock. Implementation variations include different approaches to when timestamps are recorded, the calculation of the SYNC arrival time, the use of software to process the MPEG frame and MAC packets, and the use of software to perform the time comparison.

16 Claims, 4 Drawing Sheets

CABLE MODEM CLOCK SYNCHRONIZATION USING SOFTWARE PARSING WITH HARDWARE ASSIST

CROSS REFERENCE TO RELATED APPLICATIONS

This application claims priority from the following provisional patent application, the disclosure of which is herein incorporated by reference for all purposes: U.S. Provisional Patent Application Ser. No. 60/199,720, entitled "CABLE MODEM CLOCK SYNCHRONIZATION USING SOFTWARE PARSING WITH HARDWARE ASSIST," Hirak Mitra, filed Apr. 26, 2000.

BACKGROUND

Cable-modem systems include bi-directional communications between a Cable Modem Termination System (CMTS) and a plurality of Cable Modems (CMs). During normal operation, the CMTS sends sequences of MPEG Frames to each CM. The MPEG Frames include Media Access Control (MAC) packets. One important type of MAC Packet is the SYNC packet. SYNC packets permit Cable Modems (CMs) to synchronize their local clock (the CM clock) with the CMTS clock.

To illustrate the synchronization process by way of example, assume that the CMTS sends for receipt by a particular CM a SYNC packet with the SYNC Time Value T1. The CM receives the SYNC packet sometime thereafter. Functionality the CM must recognize and isolate the SYNC packet to obtain the T1 time stamp, determine the SYNC Arrival Time T2 when the SYNC packet was received based on the "current" state of the CM clock, evaluate the difference between T1 and T2 to determine the clock skew between the CM clock and the CMTS timing, and use the clock skew to synchronize the CM clock.

Conceptually, the synchronization process attempts to make the SYNC Arrival Time and the SYNC Time Value identical. When this is achieved, the CM Clock is considered "synchronized" with the timing of the CMTS. This approach is a simplifying abstraction that permits the CMTS to make references to particular timeslots without regard to the actual propagation delays between the CMTS and the CM, which vary for each individual CM. Since each CM clock is kept synchronized in the above manner, the CMs interpret the timeslot references of the CMTS in a system-wide compatible manner. Thus within the maximum operating distance specification for the system, The explicit delay between the CM clock and the CMTS clock is ignored.

The process of recognizing and isolating SYNC packets within the various MPEG frames and MAC packets is referred to hereinafter as SYNC parsing. A key distinction in prior art approaches to clock synchronization has been whether SYNC parsing if performed primarily in hardware or software. The key benefit of hardware SYNC parsing is that the SYNC data may be applied immediately to synchronize the CM clock. However, hardware SYNC parsing is expensive. The key benefit of software SYNC parsing is that it is considerably less expensive than the hardware approach. Unfortunately, if the Cable Modem handles the SYNC parsing solely in software, a non-deterministic interval exists between when the SYNC packet actually arrives (at time T2) and when the Cable Modem can determine and record the arrival, at some later time T3. Therefore, software SYNC parsing is never accurate.

What is needed is an approach to Cable Modem clock synchronization that achieves the cost benefits of software SYNC parsing with the time accuracy of hardware SYNC parsing.

SUMMARY

The present invention performs SYNC parsing for Cable Modem Clock Synchronization by using software processing with hardware assist in a manner that achieves the cost benefits of software SYNC parsing with the time accuracy of hardware SYNC parsing. Hardware scans for the arrival of new MPEG frames. Whenever any MPEG frame arrives, the MPEG frame is processed to extract MAC packets. If a SYNC packet is discovered during this processing, the software determines the SYNC arrival time, a comparison is made between the time the SYNC arrival time and the SYNC time value, and the software uses the difference to adjust the Cable Modem clock. Implementation variations include different approaches to when timestamps are recorded, the calculation of the SYNC arrival time, the use of software to process the MPEG frame and MAC packets, and the use of software to perform the time comparison.

DETAILED DESCRIPTION

Figure 1:
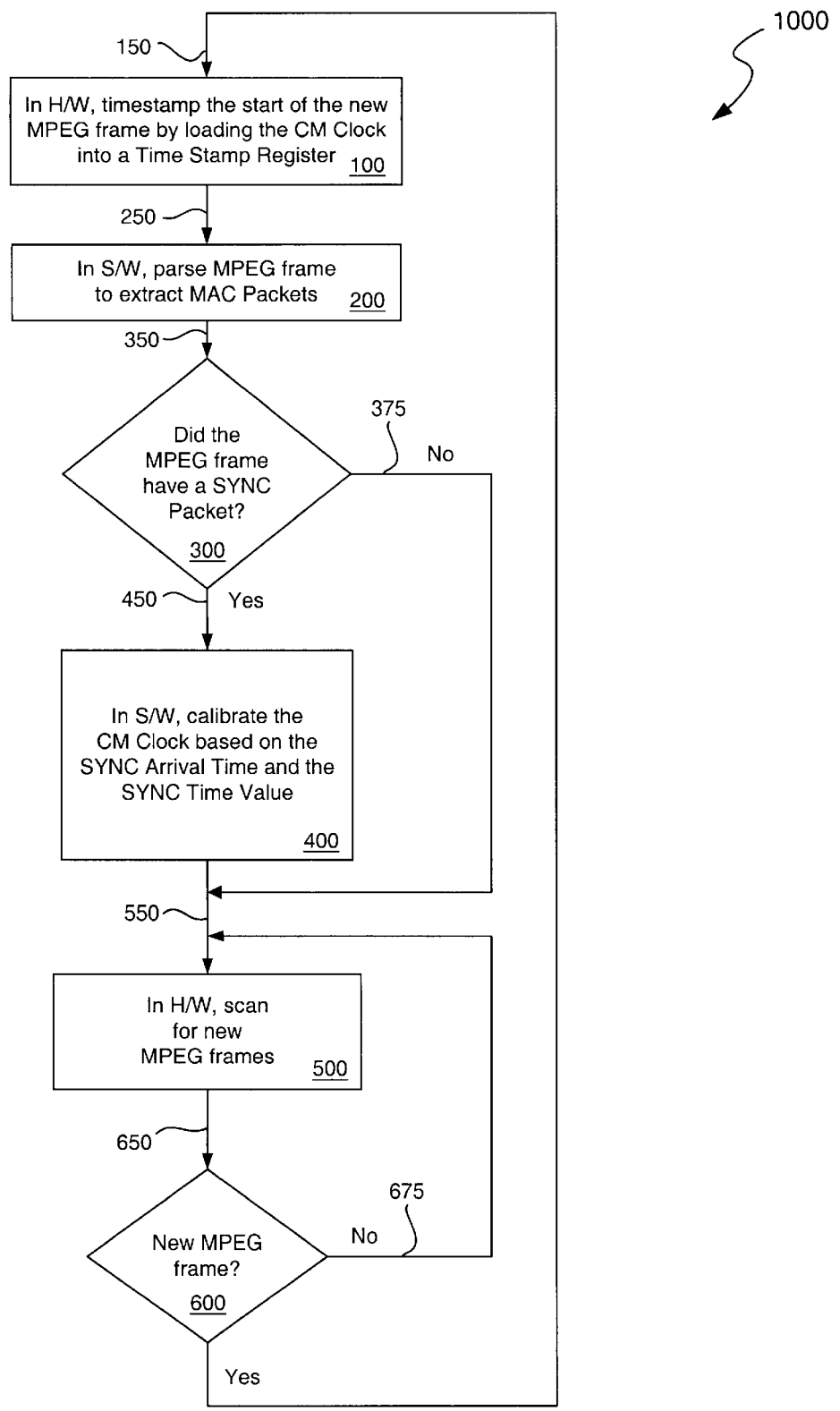
FIG. 1 is a procedure 1000 for Cable Modem Clock Synchronization, in accordance with a first illustrative embodiment of the present invention.

FIG. 1 illustrates the various stages of a clock synchronization method 1000 in accordance with a first illustrative embodiment of the present invention. In stages 500 and 600 hardware scans incoming data from the CMTS, looking for new MPEG frame instances. Whenever any MPEG frame arrives (corresponding to result 150), the Cable Modem clock value at that instant is automatically loaded into a hardware register (this is shown in stage 100), thereby time-stamping the new frame's arrival. In subsequent stages 200 and 300 software then processes the new MPEG frame to extract MAC packets, and look for a SYNC packet. If no SYNC packet is found in the MPEG frame, as represented by result 375, the clock synchronization method returns to stage 500 to repeat the above stages. However, if a SYNC packet has been discovered, as represented by result 450, the method carries out the behavior specified in stage 400, wherein the software reads the MPEG frame's timestamp, compares it to the SYNC time value (the time stamp embedded in the SYNC packet), and uses the difference to reset the Cable Modem clock.

Figure 2:
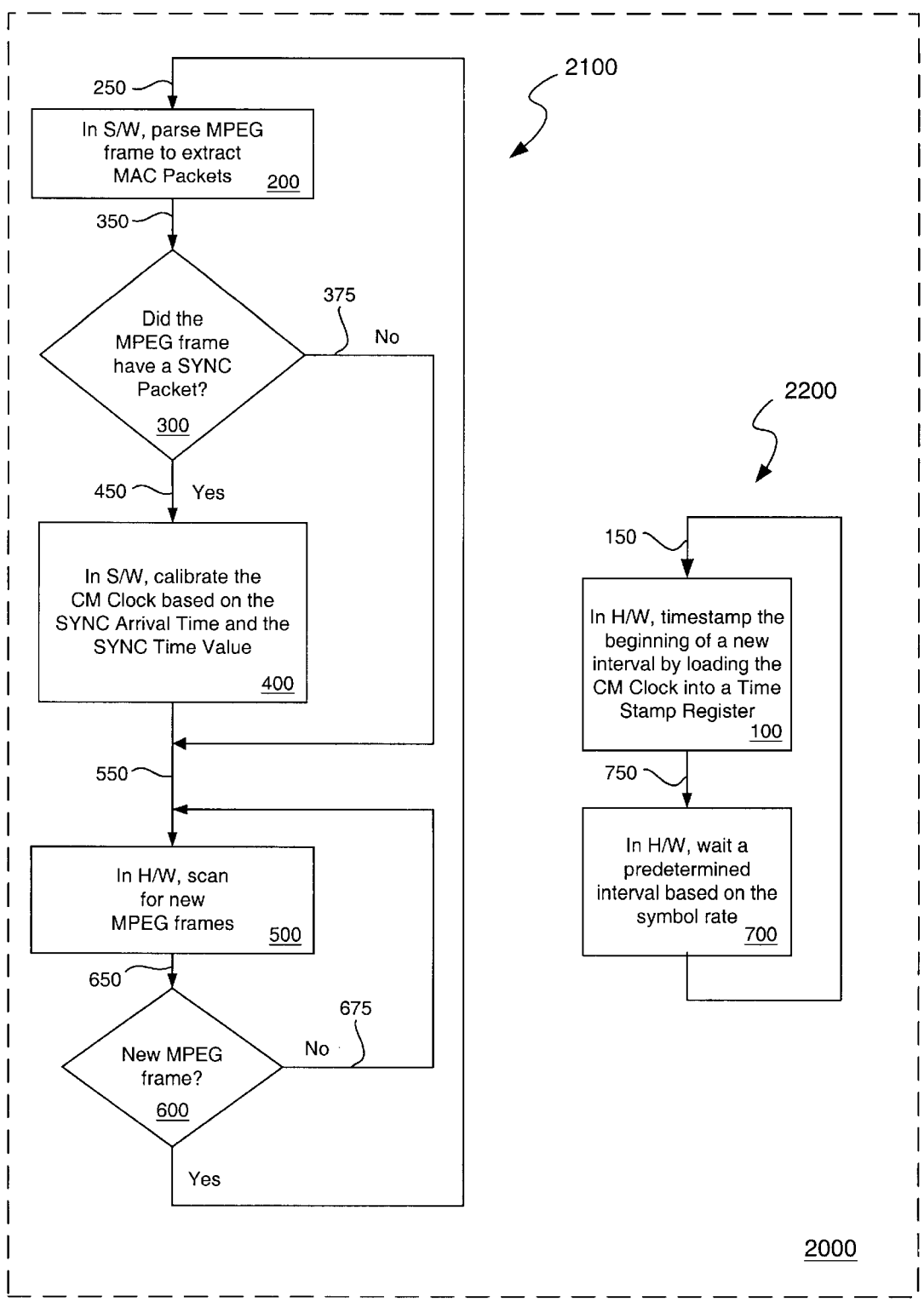
FIG. 2 is a procedure 2000 for Cable Modem Clock Synchronization, in accordance with a second illustrative embodiment of the present invention.

FIG. 2 illustrates the various stages of a clock synchronization method 2000 in accordance with a second illustrative embodiment of the present invention. In this embodiment, the timestamp is set in procedural loop 2200, which operates independently of procedural loop 2100. When QAM-64 modulation is employed, the predetermined interval between timestamps is 6405 bytes. When QAM-256 modulation is used, the predetermined interval between timestamps is 9394 bytes.

The processing of detected SYNC packets must be performed in real-time. To insure real-time processing, the time interval between the arrival of the SYNC packet (discussed in more detail below) and setting the clock (the culmination of stage 400) in response to the SYNC packet, must be orders of magnitude smaller than the time span between occurrences of SYNC packets. Thus the processing of detected SYNC packets may be done in software, provided that the MPEG parser and MAC parser functions (of stages 200 and 300) are given very high priority.

Figure 3:
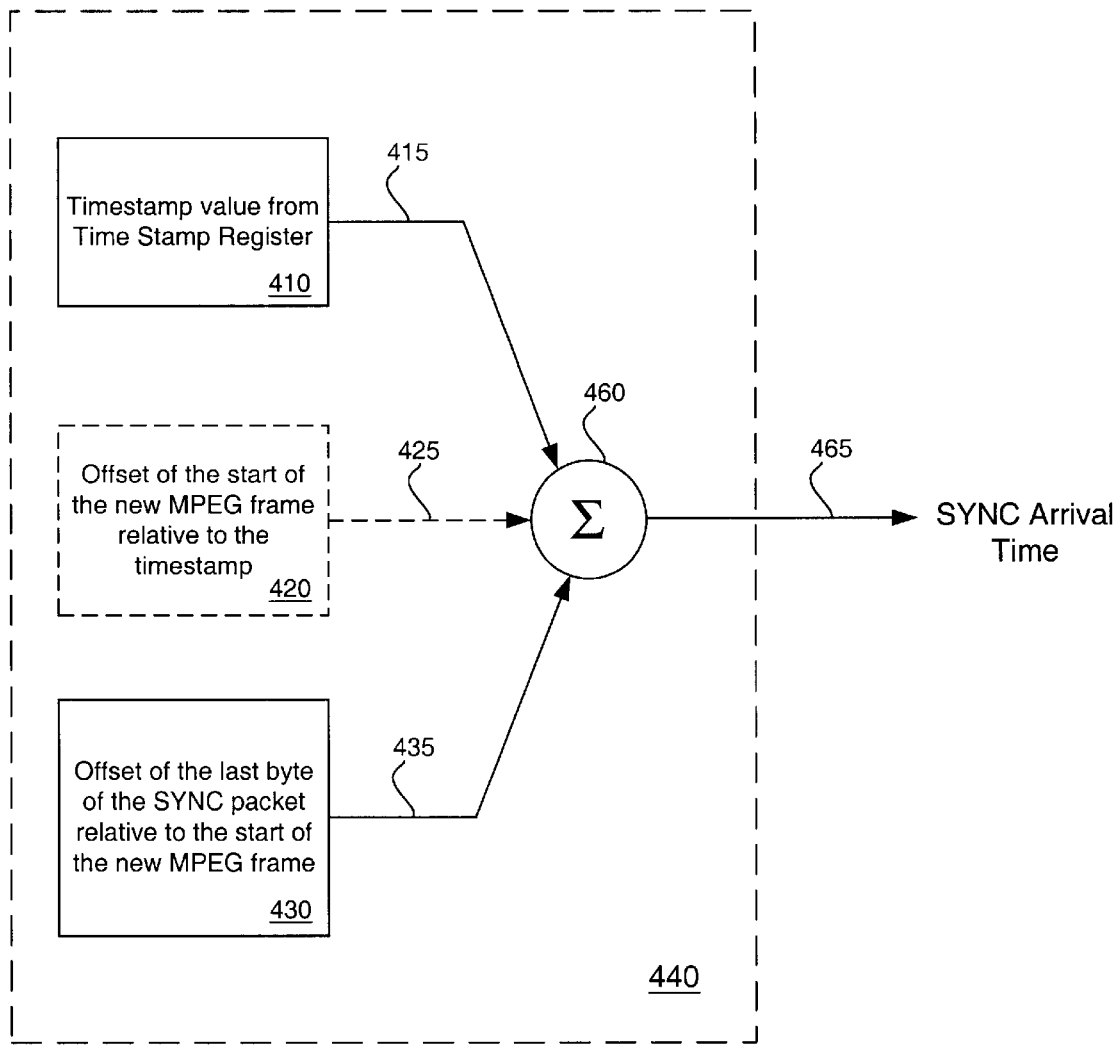
FIG. 3 illustrates the determination of the SYNC Arrival Time in block 440, a sub-function required in block 400 of FIGS. 1 and 2.

As illustrated in FIG. 3, the SYNC Arrival Time may be calculated in software based on knowledge of the hardware register timestamp, the offset of the MPEG frame to the timestamp, the offset of the SYNC packet in the MPEG frame, together with knowledge of the symbol rate. More specifically, the clock count of the arrival of the last byte of the SYNC packet is given by the clock count offset of the arrival of the first byte of the MPEG frame plus the clock count offset of the SYNC packet's last byte. The clock count offset of the SYNC packet's last byte may be calculated by multiplying the number of clocks per symbol times the position of the SYNC packet's last byte in the MPEG frame.

As applied to the first embodiment 1000 of FIG. 1, the timestamp is set when a new MPEG frame is detected. Thus for the first embodiment 1000, the offset (420) of the MPEG frame to the timestamp is always zero, and this term (425) need not be included as part of the calculation (460) of the SYNC Arrival Time 465. As applied to the second embodiment 2000 of FIG. 2, the timestamp is set asynchronously to the detection of the new MPEG frame. Thus for the second embodiment 2000, the offset (420) of the MPEG frame to the timestamp must be a term (425) included in the calculation (460) of the SYNC Arrival Time 465.

Figure 4:
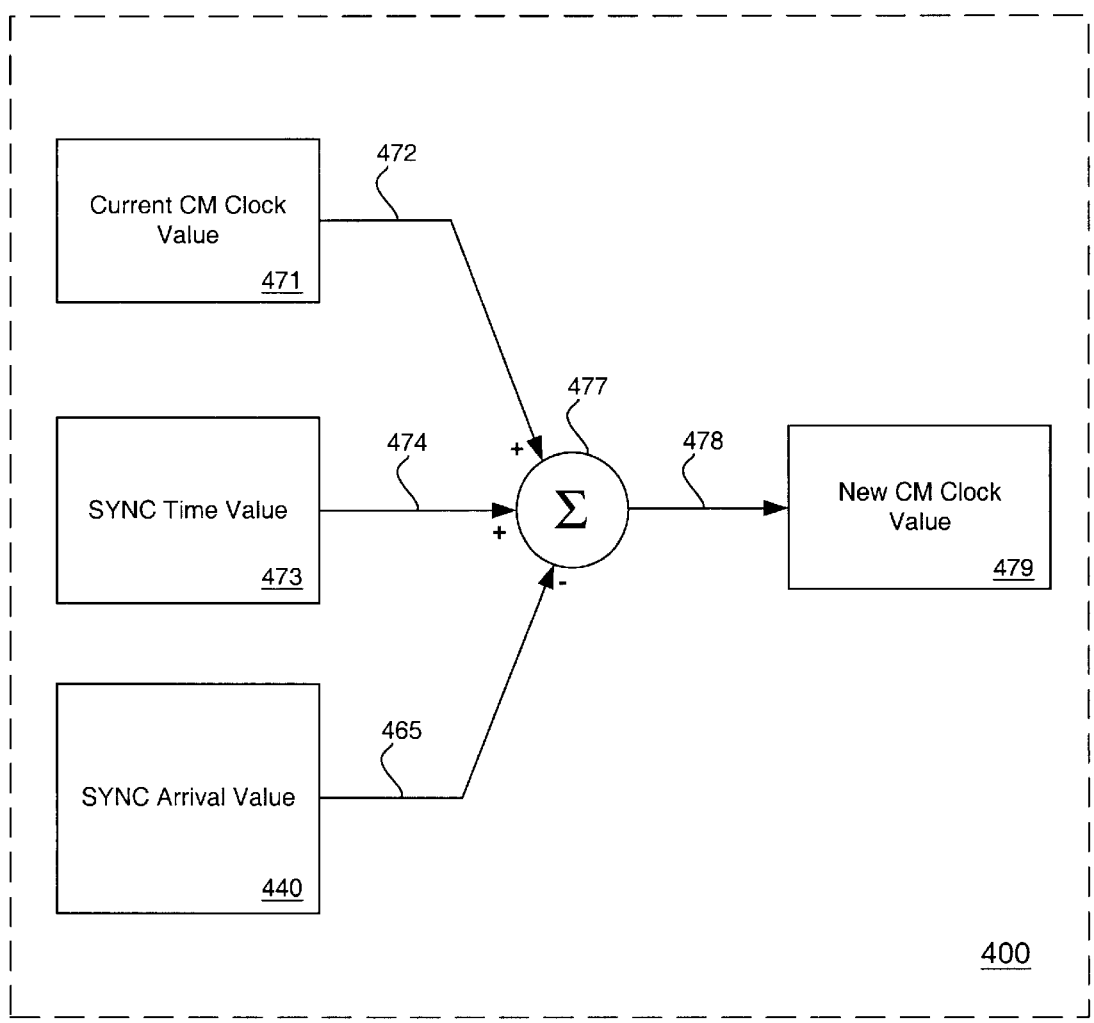
FIG. 4 provides detail of some of the functions performed in block 400 of FIGS. 1 and 2, illustrating the evaluation of the new CM Clock Value based on the SYNC Arrival Time generated by block 440 of FIG. 3 and the SYNC Time Value.

FIG. 4 illustrates the evaluation of the new CM Clock Value 479 based on the SYNC Arrival Time 465 generated by block 440 of FIG. 3 and the SYNC Time Value 474. If the SYNC Time Value is larger than the SYNC Arrival Value, then the previous value of the CM Clock 472 is augmented by a corresponding positive offset. If the SYNC Time Value is smaller than the SYNC Arrival Value, then the previous value of the CM Clock 472 is reduced via a corresponding negative offset.

CONCLUSION

Although the present invention has been described using particular illustrative embodiments, it will be understood that many variations in construction, arrangement and use are possible consistent with the teachings and within the scope of the invention. Functionally equivalent techniques known to those skilled in the art may be employed instead of those illustrated to implement various components or subsystems. All such variations in design comprise insubstantial changes over the teachings conveyed by the illustrative embodiments. The present invention is thus to be construed as including all possible modifications and variations encompassed within the scope of the appended claims.

What is claimed is:

1. A method of synchronizing the local clock in a cable modem (CM) to a remote clock at a cable modem termination system (CMTS), based on said CM's receipt of SYNC packets sent at intervals by said CMTS, each of said SYNC packets having an embedded time value, the method comprising:

a) hardware scanning for the arrival of a new MPEG frame, until said new MPEG frame arrives;

b) processing to determine if said new MPEG frame contains one of said SYNC packets;

c) if one of said SYNC packets is not found in said new MPEG frame, returning to said hardware scanning operation;

d) if one of said SYNC packets is found in said new MPEG frame, then i. evaluating the time skew between said SYNC time value and said receipt of said SYNC packet found in said new MPEG frame;

ii. adjusting the local clock based on said time skew; and iii. after said adjusting operation, returning to said hardware scanning operation.

2. The method of claim 1, wherein said processing operation is performed in software.

3. The method of claim 2, wherein said processing operation is performed in real-time.

4. The method of claim 2, wherein said processing operation is performed an order of magnitude faster than said intervals between said SYNC packets.

5. The method of claim 1, wherein said evaluating operation is performed in software.

6. The method of claim 5, wherein said receipt of said SYNC packet found in said new MPEG frame is defined by the arrival time of the last byte of said SYNC packet into the CM.

7. The method of claim 6, wherein the times are measured in clock counts.

8. The method of claim 7, further including:

subsequent to said scanning operation and prior to said processing operation, hardware recording of the local clock to time-stamp said arrival of said new MPEG frame.

9. The method of claim 8, wherein the clock count of said arrival time of said last byte of said SYNC packet is given by the clock count offset in said MPEG frame of said last byte of said SYNC packet.

10. The method of claim 7, further including:

independent of said scanning and processing operations, hardware recording of the local clock to periodically time-stamp each occurrence of a predetermined interval.

11. The method of claim 10, wherein the clock count of said arrival time of said last byte of said SYNC packet is given by the clock count offset of the arrival of the first byte of said new MPEG frame relative to the time-stamp of the last occurrence of said predetermined interval, plus the clock count offset of said last byte of said SYNC packet relative to the first byte of said new MPEG frame.

12. The method of claim 10, wherein the predetermined interval is 6405 bytes.

13. The method of claim 10, wherein the predetermined interval is 9394 bytes.

14. The method of claim 10, wherein the predetermined interval is based on the symbol rate of the selected modulation scheme.

15. The method of claim 14, wherein the selected modulation scheme is QAM-64.

16. The method of claim 14, wherein the selected modulation scheme is QAM-256.

* * * * *